April 6, 1926. 1,579,273
F. E. WRIGHT
APPARATUS FOR THE MEASUREMENT OF THE VARIATIONS IN THE FORCE OF GRAVITY
Filed May 19, 1924 2 Sheets-Sheet 1

Inventor:
Frederick E. Wright,
By Byrnes Townsend + Brickenstein,
Attorneys.

April 6, 1926. 1,579,273
F. E. WRIGHT
APPARATUS FOR THE MEASUREMENT OF THE VARIATIONS IN THE FORCE OF GRAVITY
Filed May 19, 1924 2 Sheets-Sheet 2
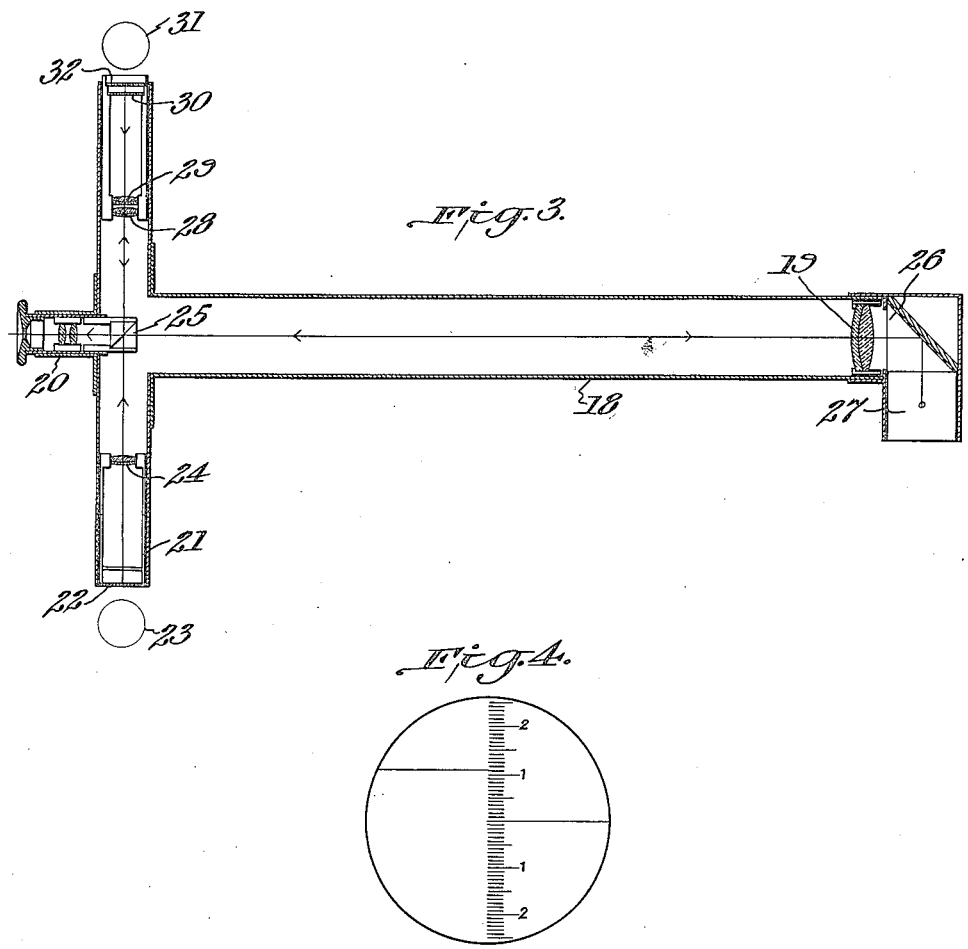

Patented Apr. 6, 1926.

1,579,273

UNITED STATES PATENT OFFICE.

FREDERICK EUGENE WRIGHT, OF WASHINGTON, DISTRICT OF COLUMBIA, ASSIGNOR TO CARNEGIE INSTITUTION OF WASHINGTON, OF WASHINGTON, DISTRICT OF COLUMBIA, A CORPORATION.

APPARATUS FOR THE MEASUREMENT OF THE VARIATIONS IN THE FORCE OF GRAVITY.

Application filed May 19, 1924. Serial No. 714,518.

*To all whom it may concern:*

Be it known that I, FREDERICK EUGENE WRIGHT, a citizen of the United States, residing at Washington, District of Columbia, have invented certain new and useful Improvements in Apparatus for the Measurement of the Variations in the Force of Gravity, of which the following is a specification.

This invention relates to an apparatus especially adapted for the measurement of the variations in the force of gravity and more particularly to an apparatus for measuring the force of gravity by counterbalancing the pull of the earth on a given mass by the deformation of an elastic system and observing the degree of deformation necessary to establish equilibrium.

For a full understanding of the invention, the principles on which it is based and its mode of operation, reference is made to the accompanying drawings in which:

Fig. 3 is a section through an optical system forming part thereof; and

Fig. 4 represents the field of view of the optical system.

Figure 1:
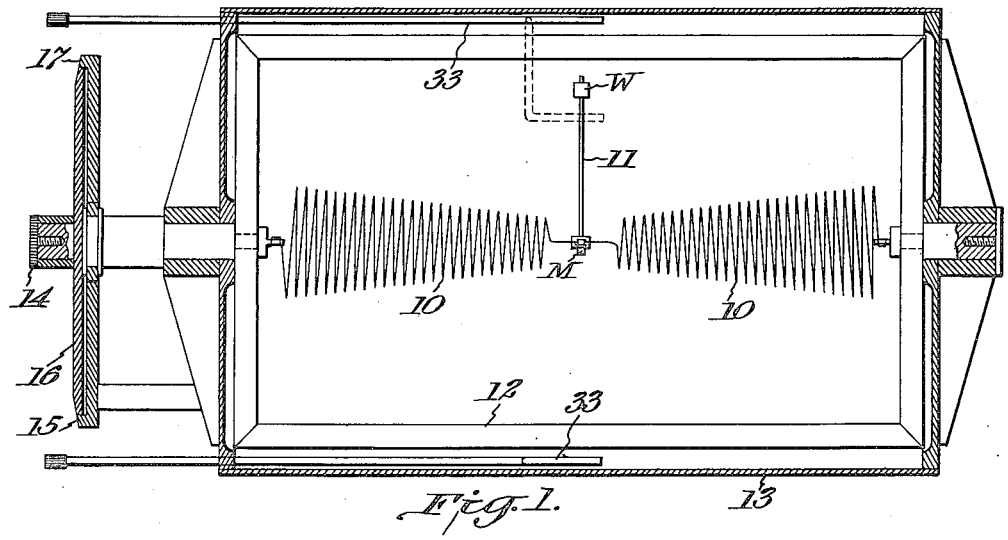
Fig. 1 is a sectional plan view of an apparatus embodying the invention.
Figure 2:
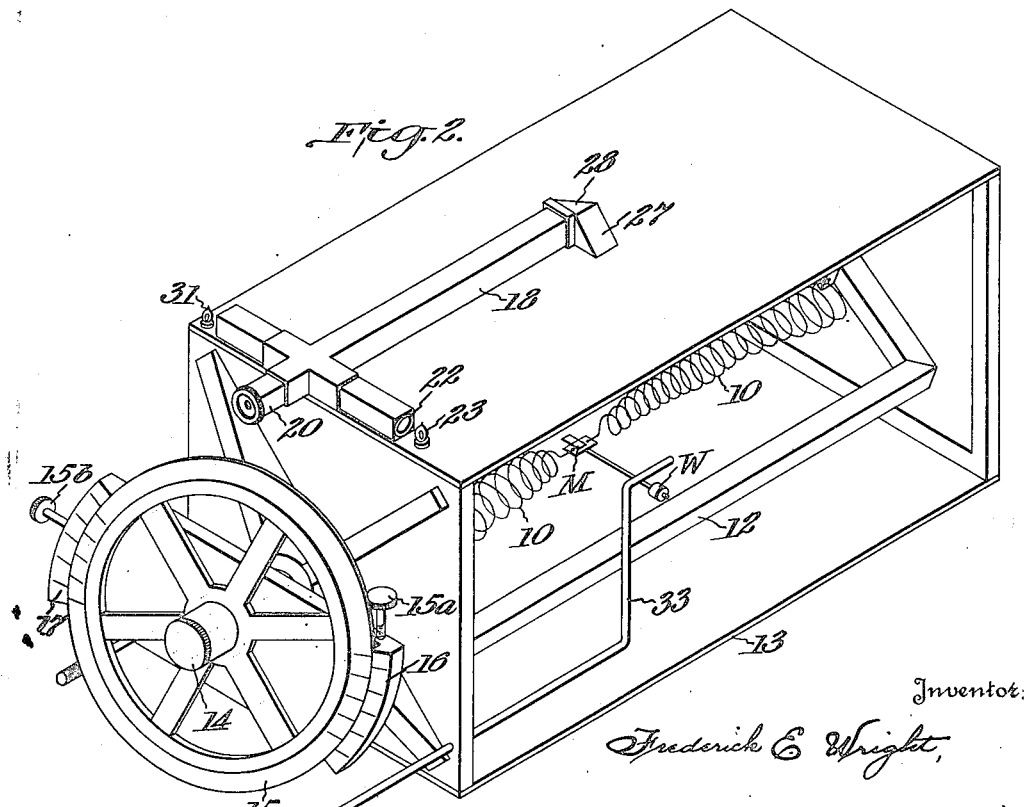
Fig. 2 is an isometric projection thereof.

It should be understood from the very outset that the idea of making relative measurements of gravitational forces by observing the degree of elastic deformation (of a medium having the desired elastic properties) necessary to counterbalance the force of gravity, is broadly not new. The principal and essential part of the apparatus is a frictionless, aperiodic, self-damping elastic system of high sensitivity. By "aperiodic" I mean "no period" or "non-periodic", in the sense that the elastic system as a whole has no natural period of vibration.

In the drawings 10 represents a helix of silica glass or of tungsten wire or other suitable material of high elasticity tapering from opposite ends toward a common center portion to which is attached in any suitable manner a relatively short arm 11. It should be understood that so far as the operation is concerned, it is immaterial whether the common center portion is an integral part of the two parts of the helix or whether the two parts of the helix are made separately and joined together. It is equally immaterial how the arm 11 is attached to the common center portion. The arrangement is generally such that the two parts of the helix are joined by a common substantially straight center portion and that to this common center is attached the arm 11. In practice I have found it mechanically exedient to form the helix of two parts and to attach the ends of the helices to the cross arm 11 by threading the wire in and out of several eyes or small loops at the end of the cross arm which preferably is of aluminum rod. The eyes may in addition be afterwards filled with shellac or cement. This arm 11 carries at its outer end a weight W while at or adjacent its inner end is mounted in fixed relation thereto a mirror M having parallel reflecting surfaces.

The helix 10 is attached at its ends to a frame 12 which is revolubly mounted in a box 13, preferably of metal. The frame 12 together with the helix 10 may be rotated by means of a shaft extension terminating in a knurled operating portion 14.

The device thus far described represents the basic elements necessary for carrying out the object of the invention and the principle of operation is broadly as follows:

The range in values of the earth's acceleration of gravity "$g$" is from 978.000 to 981.000 cm. sec.$^2$; the total practical range of an instrument for making relative measurements is thus about 3.000 and it is within this range of about 3,000-millionths of the value of the constant that the instrument must be designed to function satisfactorily.

The correlationship of the weight W, the length of the arm 11 and the characteristics of the coil 10 are as to number of turns, diameter of wire, material, etc., such that, while keeping well within the elastic limit of the material used, a number of rotations is necessary to lift the arm 11 from a true pendulum position to a standard reference position approximately horizontal. To state a concrete example, one test with an arrangement which required four turns to lift the arm 11 from the vertical to the horizontal position or eight turns from one horizontal position to the opposite horizontal position, an increase in gravity pull $dg=.000001$ $g$ involved an angular change of 10.4″, a value which can be easily measured, as is readily understood and as will be more fully described. Thus a plurality of whole turns of the frame 12 serve to counterbalance the minimum value of gravity pull met with or any standard value of gravity and the variations from the minimum or from a standard value are determined by measurement of the angular variations necessary to establish the critical equilibrium.

The tapering helical spring of silica glass or tungsten serves several purposes. Aside from the general characteristic that a helix will permit a relatively large elastic deformation within the elastic limits of its material, it has primarily two characteristics that are of the greatest importance. (1) By virtue of the high degree of elasticity Hooke's law is directly applicable, i. e., the elastic deformation is proportional to the applied load and hence the elastic strains set up are proportional to the applied load and can therefore be measured in terms of angular movement from a zero point or a standard point of reference.

(2) The tapering springs together with the arm projecting from it contain so many elements which are out of phase with any vibration that may be introduced that this is quickly and effectively damped out, so that the instrument comes quickly to rest, which is of the greatest practical importance in the sense that readings can be made expeditiously and no great care is required to find a place at which to set up the instrument.

While I have shown a progressively tapering helix and while this form represents a preferred embodiment of the invention, it is of course possible and conceivable that other forms may be used or evolved by which an aperiodic structure may be obtained.

The angle of rotation is read off on a graduated circle 15 attached to the axis of rotation of the frame 12 in cooperation with verniers 16 and 17. The horizontal position or, in general, the standard position of reference is determined by means of an autocollimating telescope sighted upon the mirror M. The reading of the circle 15 is recorded for the two horizontal positions of arm 11 and the difference in the readings of the circle for the two horizontal positions is then a measure of the elastic deformation set up in the helix by the torsion moment exerted by arm 11 in response to the gravity pull on the mass suspended at its end, i. e., the weight W.

The autocollimating telescope, which has been specially designed for expeditiously carrying out the objects of the invention, includes a main tube 18 containing the objective lens 19 and the ocular 20, two targets representing a line and a scale respectively, a plurality of reflecting prisms and a synthesizing prism.

One of the targets is a horizontal line defined by a slit 21 in a diaphragm illuminated by a source of light 23 through a ground glass 22. The slit is imaged by means of a lens 24 in the vertical plane through the axis of the telescope 18. However by means of a cemented prism cube 25 having half of the contact surface silvered, as indicated, the left half of the image is turned 90° and appears at right angle to the axis of the telescope 18.

The rays diverging from this half of the image of the slit 21 pass through the objective 19 which is disposed in a plane its own focal distance from the image or the inner edge of the silvered contact surface referred to. The rays necessarily leave the objective as parallel rays and are deflected by totally reflecting prisms 26 and 27 upon the mirror M from which, when the mirror is in substantially horizontal position or in the standard measuring position, in general, are reflected back through the prisms 26 and 27 and are then imaged by the objective in the plane of the original image, i. e., in the plane through the inner edge of the silvered surface at right angle to the axis of the tube 18 defining in the left half of the field of view of the ocular a horizontal bright line which moves up and down with the oscillations of the mirror M while the latter is substantially in the standard measuring position.

The rays of light diverging from the right half of the original image of the slit 21 pass through the unsilvered contact surface of the prism cube 25 and through lens 28 which is distant its own focal length from the telescope axis, and the parallel rays emerging from the lens 28 are in part reflected from the plane front surface of lens 29 and the reflected rays after passing again through lens 28 are imaged in the plane of the telescope axis. The rays diverging from this image are deflected by the silvered contact surface of the prism cube 25 which is turned toward the ocular.

In the axis of lenses 28 and 29 is also a target 30 in the form of a graduated scale illuminated preferably by diffused light such as produced by a source of light 31 and a ground glass screen 32. The target 30 being distant from the lens 29 the focal length of the latter, the rays coming out of lens 29 and passing into lens 28 are parallel and the image is thus formed in the same plane as the image of the slit 21 formed by lens 28. The image of the slit 21 and the image of the scale 30 are in superposed relation and appear in the right half of the field of view of the ocular 20.

The field of view of the ocular thus comprises three images. (1) The bright line constituted by the image of the slit 21 originally formed by lens 24, then formed in infinity by objective 19, then reflected by mirror M and again formed by objective 19 in its principal focal plane, which is the plane at right angle through the axis of the telescope through the inner edge of the silvered contact surface of the prism cube 25. (2) The relatively weak stationary or fixed image of the slit 21 originally formed in the plane of the axis of telescope 18, then formed in infinity by lens 28, then reflected by the front surface of lens 29 and finally formed in the image plane of lens 28, i. e., the plane in the axis of the telescope passing the inner edge of the silvered contact surface. (3) The image of the scale 31 formed by the two lenses 29 and 28 in the principal focal plane of lens 28 in superposition on the weak image of slit 21. The bright image of slit 21 occupies the left half of the field of view while the weak image of slit 21 and the image of scale 31 occupy the right half of the field of view of the ocular, the virtual image of the latter two images due to reflection from the reflecting contact surface of the prism cube being in the principal focal plane of the objective 19.

The circle 15 is first turned by means of knurled member 14 until the bright image of slit 21 is about to come into the field of view. Then the fine adjustment is made by slow adjustment screws 15$^a$ and 15$^b$, respectively, until the bright image of slit 21 assumes a position in the field of view. Thus the circle reading can be effected to 30" or 1' while the fine balance of the angle may be read off from the image of scale 30, i. e., the relation of the bright image of slit 21 to the zero position of the weak image of slit 21.

The field of view as seen through the positive eyepiece is magnified fifteen fold and is divided into halves by the vertical edge of the silvered portion of the contact surface, as previously stated.

The scale 30 is so graduated that its divisions indicate movement of the arm 11 and the mirror M carried thereby through 10" of arc.

Upsetting of the arm 11, in case the instrument is accidentally so carried as to bring the arm 11 into unstable position, is prevented by means of a rod 33 extending into the box 13.

In practice I propose to also use clamps (not shown) for preventing serious vibrations of the helix 10 during transportation. This, of course, is entirely collateral detail that does not affect the subject matter of the invention.

The box 13 which contains the helix 10 and to which the autocollimating system is rigidly attached, will in practice be inserted into a large upper ice box which in turn is surrounded by a wooden box and an end cap will complete the thermal insulation of the box 13. In case ice is not available the covering serves to render the temperature within the box substantially uniform. The temperature distribution may be ascertained by means of a resistance thermometer or a multiple junction thermo-element of copper constantan. Temperatures may thus be read to .01° C. It is essential that the mean temperature of the helix be known within .01° C. and that the influence of temperature change on the rigidity modulus of the silica, glass or tungsten wire be definitely known if the gravity measurements are to be accurate to one part in a million.

Experiments have shown that for small temperature changes between 0° and 35° C. the temperature coefficient of the rigidity modulus of silica glass is sensibly constant and that, therefore, the elastic deformation in the spiral due to a change of temperature can be expressed by means of a single factor.

The apparatus may also be equipped with leveling provisions such as are commonly used in surveying operations.

I claim:

1. In apparatus for measuring the force of gravity, the combination of a substantially horizontally disposed helix, means engaging the ends of the latter for angularly moving it about its axis and an arm extending radially outwardly from the helix and carrying at its free end a weight tending to torsionally deform the helix, the helix being so constructed that together with the arm carried by it in horizontal position it represents an aperiodic system.

2. In apparatus for measuring the force of gravity, the combination of a helix tapering from its opposite ends toward the center, means engaging the ends of the helix for angularly moving the latter about its axis in a substantially horizontal position, and an arm extending radially outwardly from the central portion of the helix and carrying at its free end a weight tending to torsionally deform the helix.

3. Apparatus according to claim 2 including means for measuring the extent of angular movement of the ends of the helix relative to a normal initial position.

4. Apparatus according to claim 2 in which the two tapering portions of the helix are separately attached to the said arm.

5. Apparatus according to claim 2 including a mirror in fixed relation to the said arm and an optical observation system cooperating with the mirror for determining when the arm is in a predetermined angular position.

6. Apparatus according to claim 5 in which the optical system is an autocollimating device including a target defining a fixed line of reference, a fixed scale, means for imaging the line of reference and the scale in the field of view of the telescope and means cooperating with the said mirror and the objective of the telescope for producing an additional image of the said line of reference in the field of view of the telescope when the said arm is substantially in the predetermined angular position.

7. The combination of a helix having the elastic characteristics of a helix of silica glass, a frame supporting the helix at its ends, means permitting angular movement of the frame about the axis of the helix, an arm extending radially outwardly from the helix and carrying at its free end a weight tending to torsionally deform the helix and means for measuring the angular movement of the frame relatively to a normal initial position thereof.

8. A combination according to claim 7 in which the helix consists of silica glass.

9. A combination according to claim 7 in which the helix tapers from opposite ends toward the center and includes a straight central portion to which the arm is connected.

10. A combination according to claim 9 including a mirror having parallel reflecting surfaces facing in opposite directions, said mirror being disposed substantially in the axis of the helix in fixed relation to the said arm.

11. A combination according to claim 10 and an autocollimating device cooperating with the mirror for determining when the arm is in either of two predetermined positions.

12. In apparatus for measuring force, the combination of a substantially horizontally disposed helix with a cross arm extending radially from it, the convolutions of the helix being such that together with the cross arm in horizontal position it represents an aperiodic system which is frictionless and self-damping.

13. An apparatus as claimed in claim 12 in which the helix comprises two tapering conical portions.

In testimony whereof, I affix my signature.

FREDERICK EUGENE WRIGHT.